United States Patent [19]

de Jesus et al.

[11] 4,196,994
[45] Apr. 8, 1980

[54] DESENSITIZED PHOTOELECTRIC DETECTOR UNIT

[75] Inventors: Charles de Jesus, Lexington; William Hudspeth, Norwell, both of Mass.

[73] Assignee: Polaroid Corporation, Cambridge, Mass.

[21] Appl. No.: 861,654

[22] Filed: Dec. 19, 1977

[51] Int. Cl.² .............. G01D 5/34; G02B 27/00; G03B 3/00; H01J 5/02
[52] U.S. Cl. .............. 354/195; 250/231 SE; 250/239; 350/276 SL
[58] Field of Search .............. 354/25, 31, 195; 350/271, 273, 275, 276 SL; 352/140; 324/175; 250/231 SE, 239

[56] References Cited

U.S. PATENT DOCUMENTS

| 2,897,717 | 8/1959 | Farrington | 350/275 |
| 3,016,798 | 1/1962 | Lawrence | 350/276 SL |
| 3,553,471 | 1/1971 | Maigret | 250/239 |
| 3,770,971 | 11/1973 | Somerset | 250/231 SE |
| 3,814,934 | 6/1974 | Mesh et al. | 250/231 SE |
| 3,886,534 | 5/1975 | Swiden et al. | 324/175 X |
| 3,942,112 | 3/1976 | Westbrook | 324/175 X |
| 4,047,106 | 9/1977 | Robinson | 324/175 |

OTHER PUBLICATIONS

Leinert et al. Stray Light Suppression in Optical Space Experiments, *Applied Optics* Mar. 1974, pp. 556–564.
Halter, E. A. Photoemitter for Recording Information, IBM Tech. Disclosure Bulletin, Mar. 1967, pp. 1374–1375.

*Primary Examiner*—Michael L. Gellner
*Assistant Examiner*—Thomas H. Tarcza
*Attorney, Agent, or Firm*—David R. Thornton

[57] ABSTRACT

A photo-electric pulse generating unit for monitoring the focus position of a camera objective lens driven in response to a range detection system and operative to generate pulses on rotation of a lens coupled encoder wheel having angularly spaced apertures movable in relation to a detector unit housing the photo-electric pulse generating unit. The unit mounts a pulse generating photo-transistor in alignment with a light source such that the photo-transistor is spaced behind an opaque wall opening to "tunnel" light from a light source upon passing through an aperture in the encoder wheel. Light diffusing surface irregularities are provided to prevent impingement of reflected or ambient light on the photo-transistor.

5 Claims, 6 Drawing Figures

4,196,994

DESENSITIZED PHOTOELECTRIC DETECTOR UNIT

BACKGROUND OF THE INVENTION

This invention relates to automatic lens focusing mechanisms for photographic cameras and more particularly, it concerns an improved photoelectric pulse generating unit for monitoring the focus position of a camera objective lens driven in response to a range detection system.

In a commonly assigned co-pending application Ser. No. 729,289, filed Oct. 4, 1976, in the name of Edwin K. Shenk, and now abandoned, there is disclosed a camera lens focusing mechanism in which an electronic logic circuit responds to a range signal related directly to the camera-subject distance in a manner to produce a train of pulses, the number of which is representative of the lens mount axial position at which the subject will be in focus. Such pulses are gated into a counter and used for operating a drive motor coupled mechanically to the lens mount. The lens mount is coupled rotatably with an encoder wheel, operative as a component of an auxiliary pulse generator in a feed-back systen, so that operation of the lens drive motor causes the auxiliary pulse generator to produce a predetermined number of pulses for each axial unit displacement of the lens mount. The logic circuit responds to the output of the auxiliary pulse generator to determine when the lens mount has been moved to the position determined by the pulse train counter to be proper for focusing the subject to be photographed. Such logic circuit response results in engagement of a pawl with a lens coupled rack to stop movement of the lens mount at the proper focusing position even though the drive motor may continue to rotate. A slip clutch in the coupling between the motor and the lens mount facilitates this latter operating characteristic.

In the feed-back system disclosed in the aforementioned copending application, the pulses corresponding to lens displacement from a pre-established position are preferably generated by rotation of slots or apertures in the lens encoder wheel between a light source, such as a light emitting diode (LED) and a photocell. The increments of angular spacing between the slots or apertures in the encoder wheel are directly related to increments of lens mount rotation which, because of a pre-established thread or camming pitch of the lens mount, represent axial increments of lens focusing movement. This arrangement has a distinct advantage from the standpoint of elimination of frictional or mechanical drag on movement of the lens mount to appropriate focusing positions and as well, it is easily adaptable to electronic circuitry suited for automatic focusing systems.

There are, however, problems presented from the standpoint of the size of the photo-electric feed-back system capable of being accomodated in a viable automatic focusing camera design, facility for assembly in the shutter housing of a camera, calibration of photocell generated pulses with lens mount movement from a given reference position, and elimination of erratic pulse generation due to exposure of the photocell to stray light.

SUMMARY OF THE PRESENT INVENTION

In accordance with the present invention, an improved photoelectric detector unit is provided for use particularly with the encoder wheel of automatic focusing systems of the afore-mentioned type and by which problems associated with faulty pulse generation as a result of stray light are substantially alleviated. The detector is a self-contained unit having an integral, opaque housing shaped to establish a pair of hollow leg portions for receiving respectively, a light source such as an LED and a photo-transistor; each of which is positioned to lie on opposite sides of an apertured encoder wheel. The photo-transistor is spaced behind an opaque wall having a slot through which light passes from the LED. In addition, potentially reflective surfaces on the unit housing are provided with light diffusing striations as a further protection against stray light reaching the photo-transistor.

Accordingly, among the objects of the present invention are; the provision of an improved photoelectric pulse generating unit particularly, though not exclusively, adapted for use in cameras equipped with automatic focusing systems; the provision of such a detector which may be fabricated as a unit to facilitate its assembly; the provision of such a detector in which sensitivity may be maximized without potential for false signal generation; and the provision of a physical structural configuration for such detectors which facilitates miniaturized components.

Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
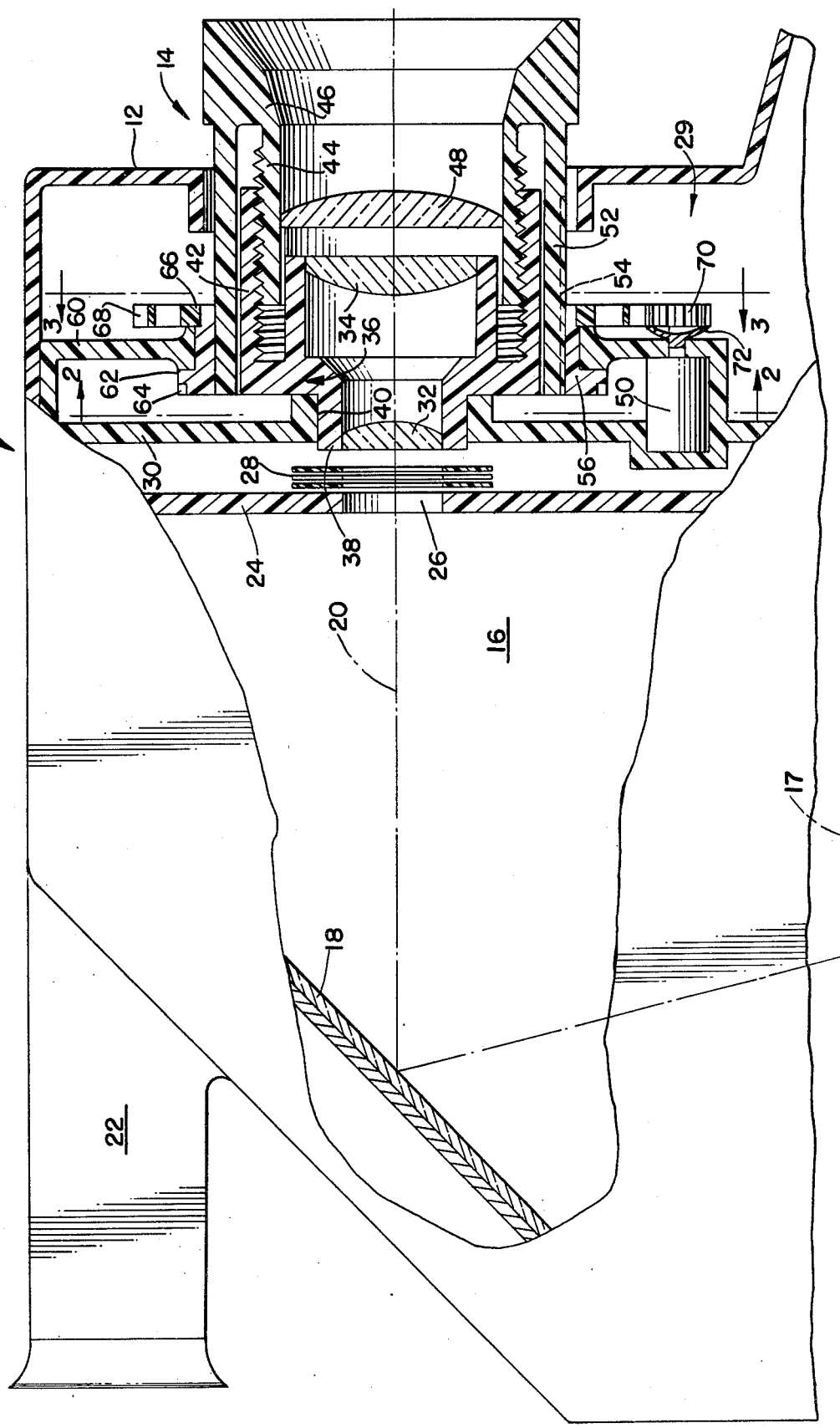
FIG. 1 is a fragmentary cross-section or cutaway side elevation of a camera incorporating the present invention.

In FIG. 1 of the drawings, a camera incorporating the present invention is shown to include an exterior casing 10 having a front wall 12 through which an objective lens is presented and generally designated by the reference numeral 14 in FIG. 1. The particular embodiment of the camera illustrated is intended as an adaptation of a well-known commercially available camera of the type in which the upper sheet of a film pack (not shown) is presented at a film plane 17 in a light-tight chamber 16 and processed after exposure by withdrawal through pressure rollers or bars (not shown) at the front of the camera. Supported in the chamber 16 is a mirror 18 by which light passing along the optical axis 20 of the lens 14 is reflected downwardly to the film plane as is well-known in the art. Also, a rearwardly extending viewfinder tube 22 extends from the rear of the exterior casing 10.

The chamber 16 is delineated at its front edge by a wall 24 having an aperture 26 therein centered on the optical axis 20 and positioned directly behind a shutter blade set 28. The several components of the exposure control system by which the shutter blades 28 are conventionally operated are omitted from the drawings in the interest of more clearly illustrating a structural embodiment of the present invention. Such components, however, will be located in the space between the walls 12 and 30 or within the "shutter housing", a term for the enclosure of such space and designated in FIG. 1 by the reference numeral 29.

Supported within the housing 29, forwardly of the shutter blades 28, is a lens board 30 for supporting the stationary components of the lens 14. In this respect, it will be noted that the lens illustrated is a three-element lens in which two stationary lens elements 32 and 34 are fixed in a cylindrical mount 36, having a rear extension 38 of reduced diameter extending through an appropriately reinforced opening 40 in the lens board 30, and secured permanently against movement relative to the lens board by appropriate means such as ultrasonic fusion, a self-locking spring washer or the like.

The fixed lens mount 36 supports a forwardly projecting, internally threaded cylindrical portion 42 adapted to receive an externally threaded cylindrical portion 44 of a movable lens mount 46 which carries a movable lens element 48. The lens system and mount, as thus described, are conventional and operate to focus a subject image on the film plane 17 upon rotation of the mount 46 to adjust the lens element 48 inwardly or outwardly relative to the element 34. Specifically, an "infinity" adjustment of the lens 14, in which subjects beyond a camera-subject range of approximately 7-9 meters will be in focus, is effected when the lens element 48 is adjusted rearwardly to a pre-established position near the element 34. Subjects at closer range than this from the camera will be brought into focus by rotation of the mount 46 in a direction to move the element 48 away from the element 34. Although such focusing adjustments of the lens 14 are conventionally made by manually rotating the lens mount 46 relative to the stationary lens mount 36, usually with the aid of either camera-subject distance calibrations on the mount 46 or with the aid of an optical range finder provided in conjunction with the viewing tube 22, the camera embodiment illustrated in FIG. 1 is adapted for use with an automatic ranging system including an electric drive motor 50. The automatic ranging system for operating the motor 50 is not shown in the drawings nor is a description thereof believed necessary for a complete understanding of the present invention. Acceptable electronic ranging systems are disclosed in U.S. Pat. No. 3,522,764 as well as in the above-mentioned copending application Ser. No. 729,289, the latter being incorporated herein by reference to the extent that the disclosure thereof is necessary for one skilled in the art to practice the present invention.

Figure 2:
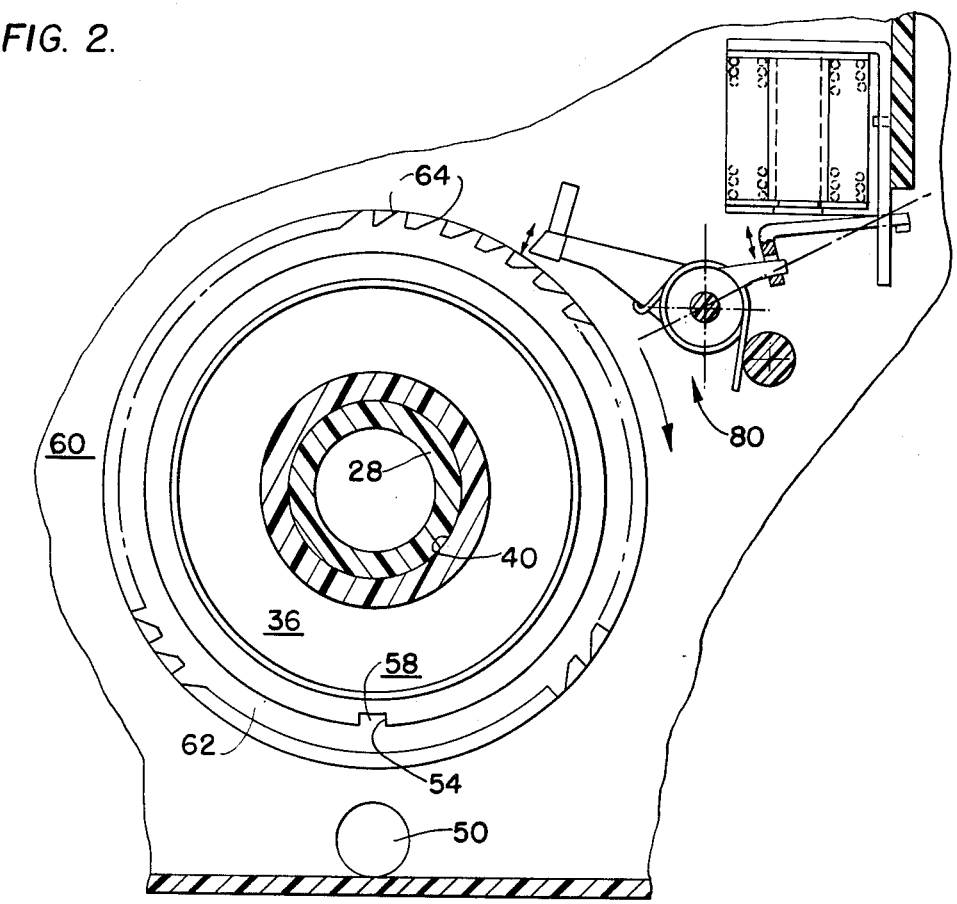
FIG. 2 is an enlarged fragmentary cross-section on line 2—2 of FIG. 1.
Figure 3:
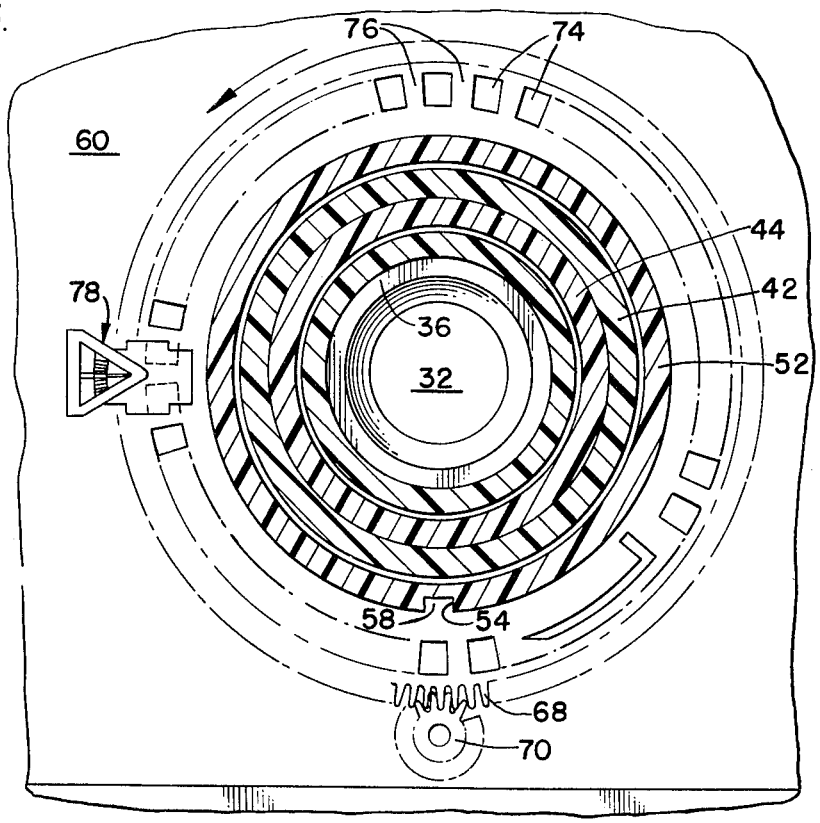
FIG. 3 is a similarly enlarged fragmentary cross-section on line 3—3 of FIG. 1.

The manner in which the lens mount 46 is coupled for rotation by operation of the motor 50 may be understood by reference to FIGS. 1-3 of the drawings. As shown most clearly in FIG. 1, the lens mount 46 is provided with a rearwardly extending cylindrical sleeve 52 having a longitudinal exterior keyway 54 or equivalent. The sleeve 52 is slidably received within a ring 56 having a tang 58 slidable in the keyway 54. The ring 56 is externally journalled for rotation in an apertured support wall 60 positioned forwardly of the lens board 30 in a manner such that it is retained against axial movement during rotation. In this latter respect, the ring 56 is provided at its rear end with a flange 62 having rack teeth 64 provided thereon. At the forward end of the ring 56, an outwardly projecting encoder wheel 66 is mounted by fusion or the like and in a manner to capture the apertured journal portion of the wall 60 to prevent axial displacement of the ring 56. The encoder ring 66 is provided with external gear teeth 68 for engagement by a gear 70 coupled to the motor 50 by way of a slip clutch 72. In light of this organization it will be appreciated that operation of the motor to rotate the gear 70, will rotate the encoder wheel 66 and ring 56 to rotate the lens mount 46 as a result of the key slot 54 and tab 58. Rotation of the lens mount 46 in this manner will not impede axial displacement of the mount and the lens element 48 as a result of the threaded interconnection of the cylindrical portions 42 and 44.

As described in the afore-mentioned co-pending application Ser. No. 729,289, the logic circuitry of the automatic focusing system disclosed therein, provides appropriate controls by which the motor 50 may be energized to rotate the encoder wheel 66 and the lens mount 46, preferably from its position of infinity, until a subject to be photographed is in focus on the film plane 17 as a result of a range detection facility provided by the system. A determination of when the lens mount has been moved through the appropriate position for focus is determined by an auxiliary pulse generator associated with the lens coupled encoder wheel. In the disclosed embodiment, therefore, the encoder wheel 66 is provided with a series of openings 74 spaced angularly by opaque wheel portions 76 and located to pass in light passing and blocking relationship to a photocell detector unit 78 (See FIG. 3). A solenoid actuated pawl mechanism 80 (FIG. 2) is positioned to engage the rack teeth 64 on the ring 56 to latch the movable lens mount 46 in a properly focused position after the appropriate number of openings 74 have passed the detector unit 78 and generated a corresponding number of auxiliary pulses.

Although the function and operation of the photoelectric detector 78 in the electronic circuitry of the automatic focusing system incorporated in the shutter housing 29 is fully disclosed in the afore-mentioned co-pending application, the physical structure of the detector 78 is important for reliable generation of auxiliary pulses resulting solely from movement of the encoder wheel during the lens focusing adjustment. As shown most clearly in FIGS. 4-6 of the drawings, the detector 78 is a self-contained unit, and as such, includes an integral housing 80 of generally U-shaped configuration to define a base portion 82 from which a pair of leg portions 84 and 86 extend to be positioned on opposite sides of the apertured flange configuration of the encoder wheel 66. The housing or casing 80 is preferably a molding of appropriate synthetic resinous material and is hollow to establish in the leg 84, a photo-transistor (light receiving) chamber 88 and an LED (light sending) chamber 90 in the leg 86, respectively. In the respective chambers 88 and 90 are mounted a photosensitive element 94 such as a photocell or preferably, a photo-transistor and a light source 92 such as an LED. Advantageously, electrical leads 93 and 95 of the light source 92 and the element 94 extend the length of their respective hollow legs to the hollow base 82 from which appropriate circuit connections may be made.

Figure 4:
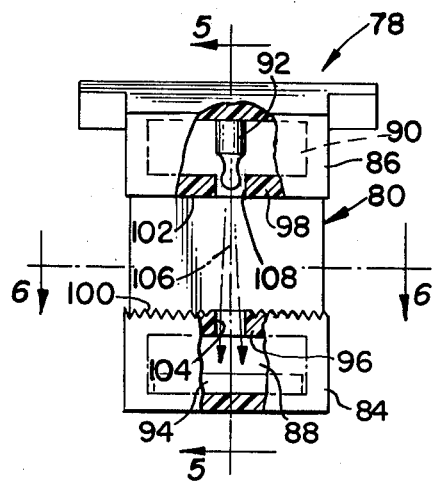
FIG. 4 is an enlarged front elevation illustrating the detector unit of the present invention.
Figure 5:
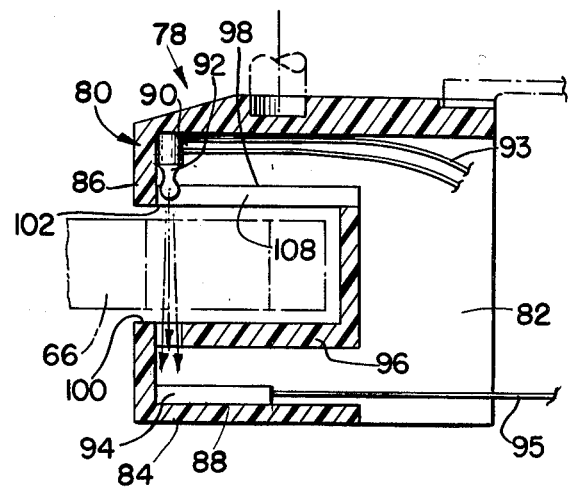
FIG. 5 is a cross-section on line 5—5 of FIG. 4.
Figure 6:
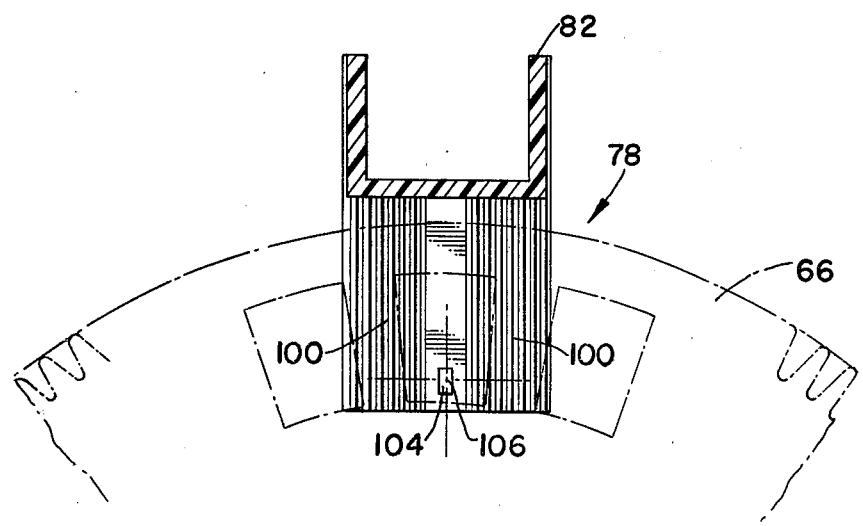
FIG. 6 is a cross-section on line 6—6 of FIG. 4.

As shown more clearly in FIGS. 4 and 5, the leg portions 84 and 86 establish opaque walls 96 and 98 to present mutually facing parallel wall surfaces 100 and 102 to be positioned on opposite sides of the encoder wheel 66. The wall 96 of the receiving chamber 88 is provided with a small, light receiving aperture 104 centered on an axis 106 perpendicular to both the wall surfaces 100 and 102. The wall 98 is formed with an elongated central slot 108 through which light from the LED 92 is transmitted to the aperture 104 and the photo-transistor 94. The elongated slot 108 extends from the base portion 82 so that the source 92 may be slid to its forward position, as shown, at the end of the hollow leg 86 without engagement of the tip of the source 92 with the wall 98. That is, for compactness, the height of the hollow leg 86 is less than the height of the light source 92, however, the elongated slot facilitates insertion of the source while also transmitting light from the source 92 to the receiver in the other leg.

It will be noted in FIGS. 4 and 5 that the photo-transistor 94 is a thin, wafer-like element supported against the interior wall surface of the leg 84 remote from the wall 96 in which the light receiving aperture 104 is formed, and the light concentrating lenses normally provided in the encapsulating housing of photo-transistors are removed such that the light receiving surface of the photo-transistor is presented directly and exclusively to light passing from the LED 92. The material of which the detector unit is made is preferably opaque, although in a strict sense only the leg 84 need be made of opaque material so as to protect the receiving element 94 from ambient illumination. In addition, all interior surfaces of the leg 84 are a dull, relatively non-reflecting black and the entrance to this hollow leg is light sealed as by plastic potting compound such that the potential for light other than that emitted by the LED 92 reaching the photocell 94 is reduced to a minimum.

The undesirable effects of stray light reaching the photocell 94 are further mitigated by the provision of light diffusing striations embossed in the surface 100 of the wall 96 in which the light receiving aperture 104 is provided. The striations in the surface 100 not only diffuse light from sources other than the LED 92, but also prevent the reflection of light around the opaque portions 76 of the encoder wheel which exist between the light passing openings 74. In other words, light passing from the LED 92, upon striking a surface portion of the encodeer wheel other than an area in which an aperture 74 is located, if reflected against the wall surface 100, will be diffused without passage to the photo-transistor 94. As a result of this construction of the detector unit 78, the photo-transistor can be selected to be extremely sensitive and capable of generating strong, distinct auxiliary pulses each time an opening 74 in the encoder wheel passes the axis 106.

Thus it will be appreciated that as a result of the present invention a highly effective photoelectric detector structure is provided by which the above-mentioned objectives are completely fulfilled. Since it will be apparent to those skilled in the art that various changes and/or modifications may be made in the disclosed embodiment without departure from underlying inventive concepts, it is expressly intended that the foregoing description is illustrative of a preferred embodiment only, not limiting, and that the true spirit and scope of the present invention be determined by reference to the appended claims.

What is claimed is:

1. In a camera having an automatic focusing system by which a lens is displaced to various focusing positions and which includes a pulse generating feedback system to monitor focusing movement of the lens mount from its prior position, said feedback system including an encoder member coupled to the lens for movement therewith, said encoder member having a plurality of spaced openings formed therein, and a detector including a light source and a light sensitive element positioned on opposite sides of said encoder member so that a pulse is generated in said detector upon the passage of each of said spaced openings between said light source and said element, the improvement wherein said detector unit further comprises a generally U-shaped housing comprising first and second hollow leg portions joined at one end by a base portion and projecting therefrom to respectively support said light source and said element, said hollow leg portions having a cavity extending the length thereof for permitting slidable insertion of said light source and said element through the base ends of said leg portions and to a location adjoining the extended ends thereof, said first and second leg portions presenting first and second spaced opaque walls respectively with mutually facing wall surfaces, each of said walls having a light passageway formed therein in alignment with each other and with said light source and said element, and said surface of said second wall facing said first wall is formed with light diffusing irregularities alongside of the passageway therethrough so as to diffuse source light reflected from the encoder member or other portions of the system and prevent passage of such reflected light to said element located in said second leg behind said second wall.

2. The apparatus recited in claim 1 wherein said light diffusing surface irregularities comprise linear striations aligned transverse the direction of encoder movement.

3. The apparatus recited in claim 1 wherein said source and said element each respectively carry at least one electrical lead, said leads being extended through respective said hollow legs to at least said base of said detector.

4. In a camera having an automatic focusing system by which a lens is displaced to various focusing positions and which includes a pulse generating feedback system to monitor focusing movement of the lens mount from its prior position, said feedback system including an encoder member coupled to the lens for movement therewith, said encoder member having a plurality of spaced openings formed therein, and a detector including a light source and a light sensitive element positioned on opposite sides of said encoder member so that a pulse is generated in said detector upon the passage of each of said spaced openings between said light source and said element, the improvement wherein said detector unit further comprises a generally U-shaped housing comprising first and second hollow leg portions joined at one end by a base portion and projecting therefrom to respectively support said light source and said element, said hollow leg portions having a cavity extending the length thereof for permitting slidable insertion of said light source and said element through the base ends of said leg portions and to a location adjoining the extended ends thereof, said first and second leg portions presenting first and second spaced opaque walls respectively with mutually facing wall surfaces, each of said walls having a light passageway formed therein in alignement with each other and with said light source and said element, and said light source has a given height, as measured in a direction parallel to its principal optical axis, which at least equals the height of the cavity in said first hollow leg, and said light passageway in said first wall is an elongated slot extending along the length of said leg to said base such that said source may be placed in its operative position by sliding said source along said hollow leg with the tip of said source extending within said slot.

5. The apparatus of claim 4 wherein said element is supported within said second leg portion on the opposite side of said second wall from said first wall and spaced a distance from said second wall to shield said element from light other than that emitted by said light source and transmitted through the spaced openings in said encoder member.

* * * * *